(12) United States Patent
Guri et al.

(10) Patent No.: US 9,703,954 B2
(45) Date of Patent: Jul. 11, 2017

(54) METHOD AND SYSTEM FOR PROTECTING COMPUTERIZED SYSTEMS FROM MALICIOUS CODE

(71) Applicant: MORPHISEC INFOMRATION SECURITY 2014 Ltd., Beer Sheva (IL)

(72) Inventors: Mordehai Guri, Modi'in (IL); Yuval Elovici, D. N. Lachish (IL); Gabi Kedma, Omer (IL)

(73) Assignee: MORPHISEC INFORMATION SECURITY 2014 LTD., Beer Sheva (IL)

( * ) Notice: Subject to any disclaimer, the term of this patent is extended or adjusted under 35 U.S.C. 154(b) by 0 days.

(21) Appl. No.: 14/760,869

(22) PCT Filed: Jan. 15, 2014

(86) PCT No.: PCT/IL2014/050033
§ 371 (c)(1),
(2) Date: Jul. 14, 2015

(87) PCT Pub. No.: WO2014/111922
PCT Pub. Date: Jul. 24, 2014

(65) Prior Publication Data
US 2015/0356297 A1      Dec. 10, 2015

(30) Foreign Application Priority Data
Jan. 21, 2013   (IL) .......................................... 224357

(51) Int. Cl.
*G06F 21/55*   (2013.01)
*G06F 21/56*   (2013.01)
(Continued)

(52) U.S. Cl.
CPC ............ *G06F 21/554* (2013.01); *G06F 21/54* (2013.01); *G06F 21/566* (2013.01); *G06F 21/57* (2013.01)

(58) Field of Classification Search
CPC ...... G06F 21/554; G06F 21/54; G06F 21/566; G06F 21/57
See application file for complete search history.

(56) References Cited

U.S. PATENT DOCUMENTS 7,913,092 B1    3/2011  Hiltunen
7,996,904 B1 *  8/2011  Chiueh ................. G06F 21/566
                                                          713/150

(Continued)

OTHER PUBLICATIONS

International Search Report of a counterpart foreign application, mailed May 1, 2014; 5 pages.
(Continued)

*Primary Examiner* — Brandon Hoffman
*Assistant Examiner* — Wasika Nipa
(74) *Attorney, Agent, or Firm* — Roach Brown McCarthy & Gruber, P.C.; Kevin D. McCarthy (57) ABSTRACT

The invention relates to a method for providing a computerized system which is protected from malicious programs coming from an external source, the method comprises the steps of (a) secretly, and in a manner unknown to authors of external programs, modifying one or more essential elements at the protected system in a manner which causes all running programs to fail, unless they are subjected to a compatible modification which enables them to run properly; and (b) modifying each program at the computerized system which is known to be benign in order to comply with said modification of one or more essential elements, thereby to enable it to be executed properly.

16 Claims, 10 Drawing Sheets

(51) Int. Cl.
*G06F 21/54* (2013.01)
*G06F 21/57* (2013.01)

(56) References Cited

U.S. PATENT DOCUMENTS

| | | | |
|---|---|---|---|
| 8,707,433 B1* | 4/2014 | Mann | G06F 11/3003 726/22 |
| 8,782,434 B1* | 7/2014 | Ghose | G06F 9/3851 711/118 |
| 8,984,478 B2* | 3/2015 | Epstein | G06F 12/1475 717/110 |
| 2003/0172109 A1 | 9/2003 | Dalton | |
| 2003/0237028 A1 | 12/2003 | Mantyla | |
| 2004/0168173 A1 | 8/2004 | Cohen | |
| 2004/0237071 A1 | 11/2004 | Hollander | |
| 2005/0188171 A1 | 8/2005 | McIntosh | |
| 2007/0016952 A1* | 1/2007 | Stevens | G06F 21/51 726/24 |
| 2007/0050848 A1* | 3/2007 | Khalid | G06F 21/52 726/24 |
| 2007/0220601 A1 | 9/2007 | Huelsbergen | |
| 2012/0159630 A1* | 6/2012 | Wang | G06F 21/51 726/24 |
| 2012/0210443 A1 | 8/2012 | Blaisdell | |

OTHER PUBLICATIONS

Written Opinion of the International Searching Authority, mailed May 1, 2014; 5 pages.
International Preliminary Report on Patentability of a counterpart foreign application—PCT/IL2014/050033, mailed Aug. 10, 2015; 14 pages.
Appendix 1, https://en.wikipedia.org/wiki/Fatal_exception-error; obtained Sep. 14, 2016; last modified on May 29, 2016; 1 page.

* cited by examiner

METHOD AND SYSTEM FOR PROTECTING COMPUTERIZED SYSTEMS FROM MALICIOUS CODE

FIELD OF THE INVENTION

The invention relates to the field of information security. More particularly, the invention provides a system and method for protecting a computerized system from malicious code. More specifically, the invention modifies essential elements within the programing interface of the operating system or the instruction set for preventing the expected operation of any unauthorized code including malicious software. Any code which is expected to run on the operating system must be appropriately modified, otherwise, it will fail or will cause an alarm.

BACKGROUND OF THE INVENTION

The present art provides several manners by which a computerized system (including mobile devices, such as smart phones) can be protected from a malicious code:
  a. Preventing unauthorized code (hereinafter, also referred to as "program" or "application") from entering the system, by checking its validity (such as its signature, its originating source, etc.);
  b. Performing a static analysis of the program to ensure that it does not include a malicious code;
  c. Shielding the operating system from being exploited through known vulnerabilities by constantly patching such vulnerabilities as soon as they are exposed.
  d. Monitoring the behavior of suspicious programs while they run on the system or on a sandbox.

However, the abovementioned prior art means for the system protection suffer from at least one of the following flaws:
  a. They require a prior knowledge by the protector either with respect to the code, to its origin, or to its behavior;
  b. They require assumptions with respect to normal or anomalous behavior of the protected system.
  c. They require prior knowledge of exploitable vulnerabilities, and will not identify a new (hitherto unknown) exploit.
  d. They may detect the malicious behavior too late, after a significant damage has already been caused to the system including the protected resources.
  e. It is not clear when and how the malicious activity is triggered, furthermore, modern malware use evasion and anti-forensics techniques which severely hinder their detection.
  f. A previously certified program may at some stage open the gate for malicious code.
  g. Malicious code may operate solely in memory without passing through the file system.

The present invention is particularly, but not exclusively, applicable to any operating system whose source code is available for recompilation (Open Source); The concepts of the present invention can also be applied to binary code (Closed Source). Moreover, the present invention is particularly but not exclusively applicable to 'isolated' operating systems which are intended to run special purpose programs and are not designated to run a variety of third-party consumer applications; Yet the concepts of the present invention can be applied to other kinds of operating systems including operating systems for mobile devices.

Over the last few years, there have been reports of highly protected operating systems (OS), even isolated ones, that were compromised by malicious programs. Unlike a regular consumer-oriented OS, an isolated OS is designated to run special purpose programs. Malicious exploitation of such operating systems may bear critical consequences. At the same time new kinds of operating system such as Android were also being compromised at an accelerating rate.

Open source operating systems (primarily Linux) are widely being adopted in a wide range of domains, from smart phones to High Performance Computing (HPC). The open source operating systems may also be used in isolated systems. It is therefore an object of the present invention to provide a method and system for protecting a computerized system from malicious code, either known or unknown, either on open source systems or on closed source systems.

It is an object of the present invention to provide a method and system for protecting a computerized system from malicious code, which overcomes all the above mentioned drawbacks of existing means for detection and prevention.

It is another object of the present invention to provide a method and system for protecting a computerized system from malicious code, which does not require any prior knowledge about the malicious program, its structure, its behavior, or its origin.

It is still another object of the present invention to provide a method and system for protecting a computerized system from malicious code, which does not require any assumption with respect to the normal or anomalous behavior of the protected system.

It is still another object of the present invention to provide a method and system for protecting a computerized system from malicious code, which does not require prior knowledge of exploitable vulnerabilities.

It is still another object of the present invention to provide a method and system for protecting a computerized system from malicious code, which can prevent any operation of an unauthorized program, or to route it to operate in a restricted supervised mode.

It is still another object of the present invention to provide a method and system for protecting a computerized system from malicious code, which is immune to common evasion and anti-forensics techniques.

It is still another object of the present invention to provide a method and system for protecting a computerized system from malicious code which bypasses the standard gate keeping mechanisms of a protected system.

It is still another object of the present invention to provide a method and system for protecting a computerized system from malicious code which operates solely in memory without passing through the file system.

It is still another object of the present invention to provide a method and system for protecting a computerized system from malicious code, which may either replace conventional protection means, or may cooperate with them.

It is still another object of the present invention to provide a method and system for protecting a computerized system from malicious code, which may be easily updated on a periodical basis, and may include random ingredients to thwart a bypass by the attacker.

Other objects and advantages of the present invention will become clear as the description proceeds.

SUMMARY OF THE INVENTION

The invention relates to a method for providing a computerized system which is protected from malicious programs coming from an external source, the method comprises the steps of: (a) secretly, and in a manner unknown to authors of external programs, modifying one or more essential elements at the protected system in a manner which causes all running programs to fail, unless they are subjected to a compatible modification which enables them to run properly; and (b) modifying each program at the computerized system which is known to be benign in order to comply with said modification of one or more essential elements, thereby to enable it to be executed properly.

Preferably, said modifications involve a modification to one or more essential elements at the operating system, and to each benign program.

Preferably, when a program that does not comply with said modifications is found, the program is halted or sent to a sandbox, and an alert is raised.

Preferably, said modifications involve a modification to an operating system at said system, and wherein said modification to each benign program involves a compatible modification to the instruction set used by the program.

Preferably, said modifications involve a modification to an instruction set of a processor at said system, and wherein said modification to each benign program involves a compatible modification to the instruction set used by the program.

Preferably, the method of the invention is adapted for a static linking, wherein said modification at the protected system involves modification to at least one service routine and to a wrapper routine in the standard library, and wherein said modification to each of the benign programs is a compatible modification to the signature of the program.

Preferably, the method of the invention is adapted for a dynamic linking, wherein said modification at the protected system involves maintaining two copies of the dynamic standard library, a first copy of the dynamic standard library under its original name, and a under a modified name, and wherein said modification to each of the benign programs is a compatible modification to call said modified copy of the dynamic standard library.

Preferably, the method further includes a stub to detect programs that do not comply with said modification at the protected system.

Preferably, the method is adapted for a dynamic linking, wherein said modification at the protected system involves modification to a wrapper routine in the user mode and to the system call service routing in the kernel mode, and wherein said modification to each of the benign programs is a compatible modification to signatures of one or more system call invocations.

Preferably, said modification at the protected system involves modification to the names of one or more methods in a dynamic link library, and wherein each of the benign programs are modified to conform with said modification in said dynamic link library.

Preferably, the processor is a physical processor. Alternatively, the processor is a virtual processor.

Preferably, said modifications are made on a temporal basis, each time a different subset of essential elements and respective parameters are selected for modification.

Preferably, the modification to said program further involves recompilation and or relinking of the program.

Preferably, the modification to said operating system further involves recompilation and or relinking of the operating system.

DETAILED DESCRIPTION OF PREFERRED EMBODIMENTS

As noted above, prior art means for protecting a computerized system from a malicious program suffer from various kinds of drawbacks. As will be shown, the present invention overcomes all said drawbacks.

Modern operating systems, whether Open Source or Close Source, are designed with modularity and extensibility as primary guidelines. Standardization of the programing interface is therefore an essential requirement of all operating systems.

Some essential elements of the operating system are not expected to be modified, and when such elements are modified, some aspects of said element are traditionally expected to be kept untouched. For example, the set of system calls which are implemented by the operating system can be extended by the addition of a new system call, and the underlying code of an existing system call can be modified to enhance its performance. Yet the signature of an existing system call is traditionally expected to be kept untouched. Said signature includes the number and the types of the arguments (parameters) which are passed to the system call upon invocation, as well as the type of the 'return value' which is returned to the caller when the system call exits.

The very nature of modern operating systems prohibits such modifications because they compromise the need for a standard programming interface, which allows convenient development of useful programs, including applications as well as extensions to the operating system itself. Keeping the standard programming interface untouched, with the convenience which is guaranteed by this practice, is a highly attractive feature of any modern operating system.

Thus, deviations from the standard programming interface of a given operating system are regularly prohibited, and a developer of a new or existing program has no reason to anticipate any of such modifications. Furthermore, when such modifications (nonstandard deviations from the standard programming interface) occur, a developer of a new or existing program must have direct access to the modified programming interface, including the modified standard libraries.

It has been found by the inventors of this application, that the negative effects of said deviations can form an asset when coping with malicious programs. The present invention utilizes such unconventional modifications to the operating system to detect and prevent the operation of malicious programs, where the malware's author does not have access to the OS modifications. On the other hand, useful benign applications are properly modified by a central security authority to comply with the modified operating system, thus allowing them to run properly.

The present invention is particularly but not exclusively suited for Android devices. Android's kernel is open source Linux, and its user level applications run on the Dalvik virtual machine, which is also open source. An application which is intended to run on Dalvik is compiled into Dalvik bytecode, which is considerably easier to manipulate than hardware's machine code. Thus, even when a Dalvik application's source code is not provided, the application's bytecode can still be analyzed, manipulated, and/or decompiled in a relatively convenient and safe manner.

The following description provides five exemplary embodiments. Even though the concepts of the various embodiments are applicable to various types of operating systems and for various levels of code, for the sake of convenience and more clarity the following first and second embodiments are described in terms of the Linux operating system, while the third embodiment is described in terms of the Windows operating system, and the fourth embodiment is described in terms of the instruction-set at the machine level. The fifth embodiment is described in terms of Java or similar bytecode, where either a Virtual Machine (VM) or a Just In Time (JIT) compiler is applied. Furthermore, the invention as described herein is not limited to any particular level of the computerized system. For example, the modifications may be applied to essential elements of the operating system's user or kernel mode, to a hypervisor, or to the instruction set of the machine, either physical or virtual.

Figure 1:
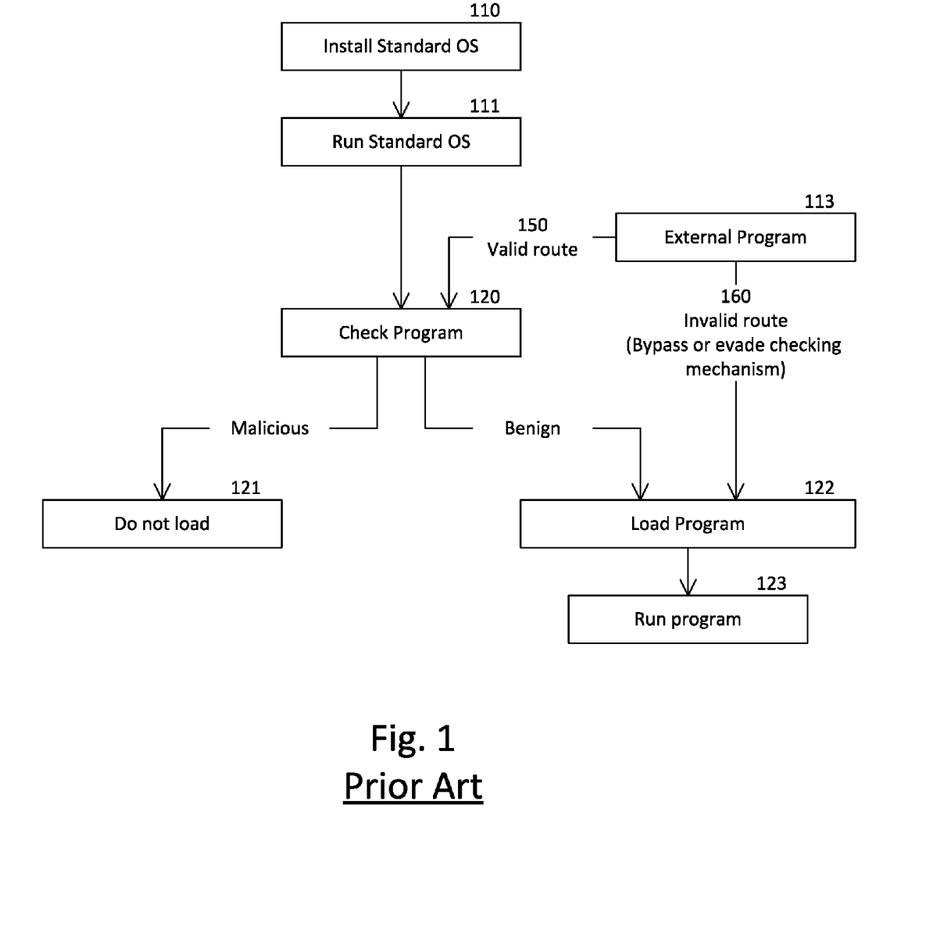
FIG. 1 shows in conceptual terms the manner by which protection of a conventional system is performed.

FIG. 1 shows in conceptual terms the manner by which protection of a conventional system is performed. Initially, a standard operating system is installed 110 and run 111. When an external program 113 is encountered, the operating system routes the external program (through the so called "valid route" 150) to a "checking program" stage or module 120. The term "external program", refers herein to any new piece of code which originates outside of the running operating system. The "checking program" stage 120 checks in some conventional manner known in the art said external program to determine whether it is a malicious or a benign code. The "check program" stage 120 may also use a reputation knowledge base as a sort of "white list". If the program is found to be benign, the operating system may load the program into memory in executable mode (step 122), and allows it to run (step 123). The check program stage 120, may also monitor the external program while it runs, also in a conventional manner well known in the art. However, if the checking program stage 120 finds the external program to be malicious, the running of the program is aborted in step 121, and additional measures well known in the art may also be taken.

As noted, the conventional protection manner of FIG. 1 entirely depends on the "checking program" stage 120, as any bypass of this stage will allow a malicious program to run on the system. More specifically, when the external program 113 somehow succeeds in taking the "invalid rout" 160, it bypasses or evades the "checking program" stage 120, and it can successfully run on the system, with all the damaging consequences associated with such evasion. In general terms, there are various manners (which involve either software or physical measures) by which a program may take the "invalid route" 160. The defending side continuously tries to force an external program to use only the valid route 150, while blocking possibilities to exploit the bypass route 160. On the other hand, attackers continuously and repeatedly try to find ways to bypass or evade the valid route 150 (therefore avoid or mislead the "check program" 120), while using the bypass route 160. When succeeding in taking the invalid route 160, the malicious program can be loaded 122, and run 123, with all the damaging consequences.

Figure 2:
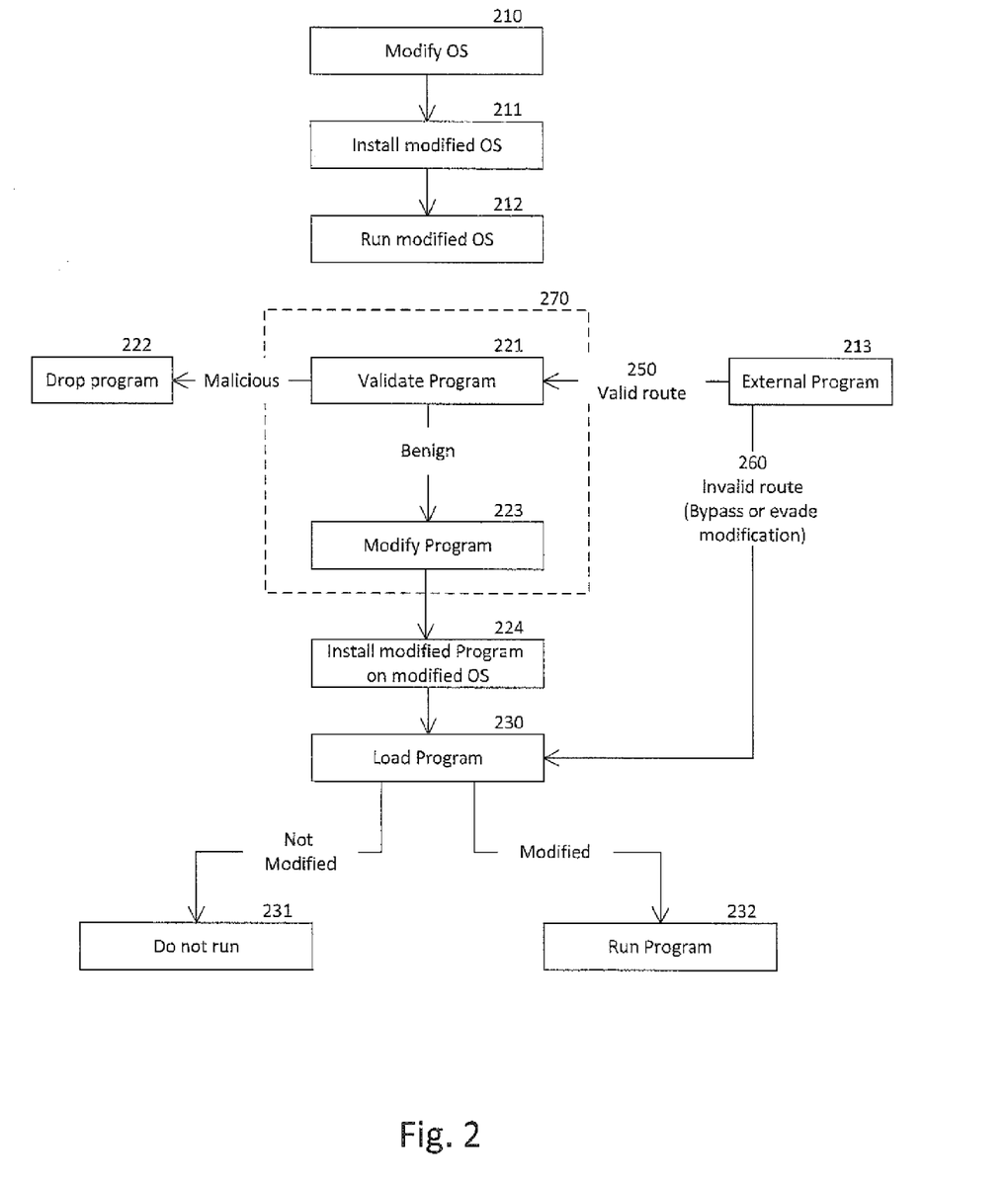
FIG. 2 shows in conceptual terms the manner by which protection of a computerized system according to the present invention is performed.

FIG. 2 shows in conceptual terms the manner by which protection of a computerized system according to the present invention is performed. Initially, a standard operating system is internally modified 210 in a manner which is unknown to authors of external programs, either benign or malicious. As will be described hereinafter, various manners of modifications may be applied at this stage 210. This modification to the operating system is generally intended to form a variant of the operating system which does not allow any external program to run on the modified operating system, unless this external program is subjected to a proper corresponding modification which cannot be foreseen by the external program author. In step 211, the modified variant of the operating system is installed and run 212. It should be noted that both steps 210 and 211 are performed by a central security authority 270, which will be further discussed hereinafter.

Any external program 213 which is received at the central security authority 270 through a valid route 250, is subjected to a validation procedure 221. The validation procedure 221 thoroughly verifies that the program is benign. If the external program 220 is found to be malicious or otherwise suspicious, it is dropped 222. Only if the external program 220 is found to be benign, it is subjected to a modification procedure 223. The modification procedure 223 is intended to make the external program be compliant with the operating system as modified in step 210.

Following said validation 221 and modification 223 of the external program 213, the central security authority 270 installs 224 the external program as modified in step 223 on said modified operating system. In step 230, the modified external program can be loaded into memory in an executable mode, and run in step 232.

Any external program 213 which uses the invalid route 260 by bypassing or evading the central authority 270, and arrives at the "load program" step 230, will fail to run as depicted in step 231, as it was not previously modified to comply with the modified operating system (as modified in step 210). This is in contrast to the prior art system of FIG. 1, in which any external program which succeeds in taking the invalid route 160 will be successfully loaded 122 and run 123.

Some types of central security authority are known in previous art. One of the tasks of such prior art central security authorities is to validate external programs (i.e., programs from external origin). However, none of said central authorities perform the modification step 223 to comply with the operating system, as modified in step 210 (which is also performed by the central security authority 270.

As previously noted, essential elements within the operating system are modified such that malicious programs that were originally compiled and linked with the original standard OS libraries, will not operate within the modified operating system. Any attempt at running them within the modified operating system will raise an alert to the central security authority, and subsequently may be either terminated or sandboxed. On the other hand, properly modified external programs will properly be loaded and run.

In a first embodiment of the invention, said modification is made to the signatures for a given subset of the operating system (OS), i.e., "system calls".

Figure 3A:
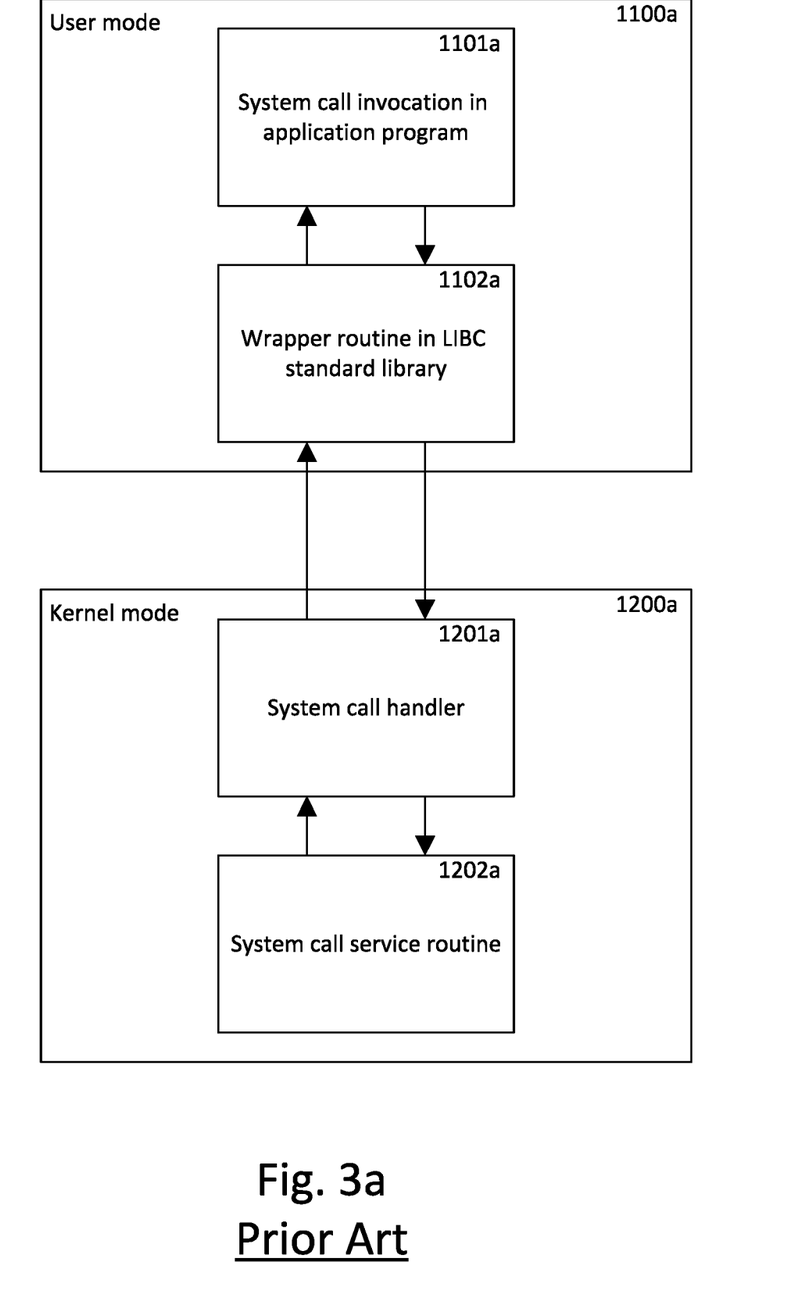
FIG. 3a illustrates a typical flow of a system call from its invocation at a user mode application, to its final implementation by a kernel mode service routing, in a conventional system, such as Linux.

FIG. 3*a* illustrates a typical flow of a system call from its invocation 1101*a* at a user mode application, to its final implementation by a kernel mode service routing 1202*a*, in a conventional system, such as Linux. An application running at user mode 1100*a* initiates a system call invocation 1101*a*, passing the call in a form of the standard signature of this specific system call, to a wrapper routine 1102*a* which resides in a standard library such as LIBC or its equivalent. In this context which is well known, the term signature typically refers to a function name, the types, order, and number of its parameters, and the type of the function's return value. The wrapper routine 1102*a* (also known as library routine) may perform some additional operations, and then it passes the call to the system call handler 1201*a* at kernel mode 1200*a*. If the signature of the invoked function does match the signature expected by the wrapper routing 1102*a*, then the call will fail with unexpected results. In case of static linking, the code will fail to link or even to compile. The system call handler 1201*a*, residing at kernel mode 1200*a* receives the call from the wrapper routing 1102*a*, and dispatches it to the proper system call service routine 1202*a*, also in kernel mode. Here again, if the signature of the call passed from the handler 1201*a* does not match the expected signature, then the service routine 1202*a* will fail with unexpected consequences. Otherwise, in a normal operation when there is no exception, the service routine 1202*a* performs its assigned task, and returns the requested result along with a code which indicates success. As shown, a wrong signature will cause failure of the operation either at the standard library wrapper routine 1102*a* (at user mode 1100*a*) or at the service routine 1202*a* (at kernel mode).

Figure 3B:
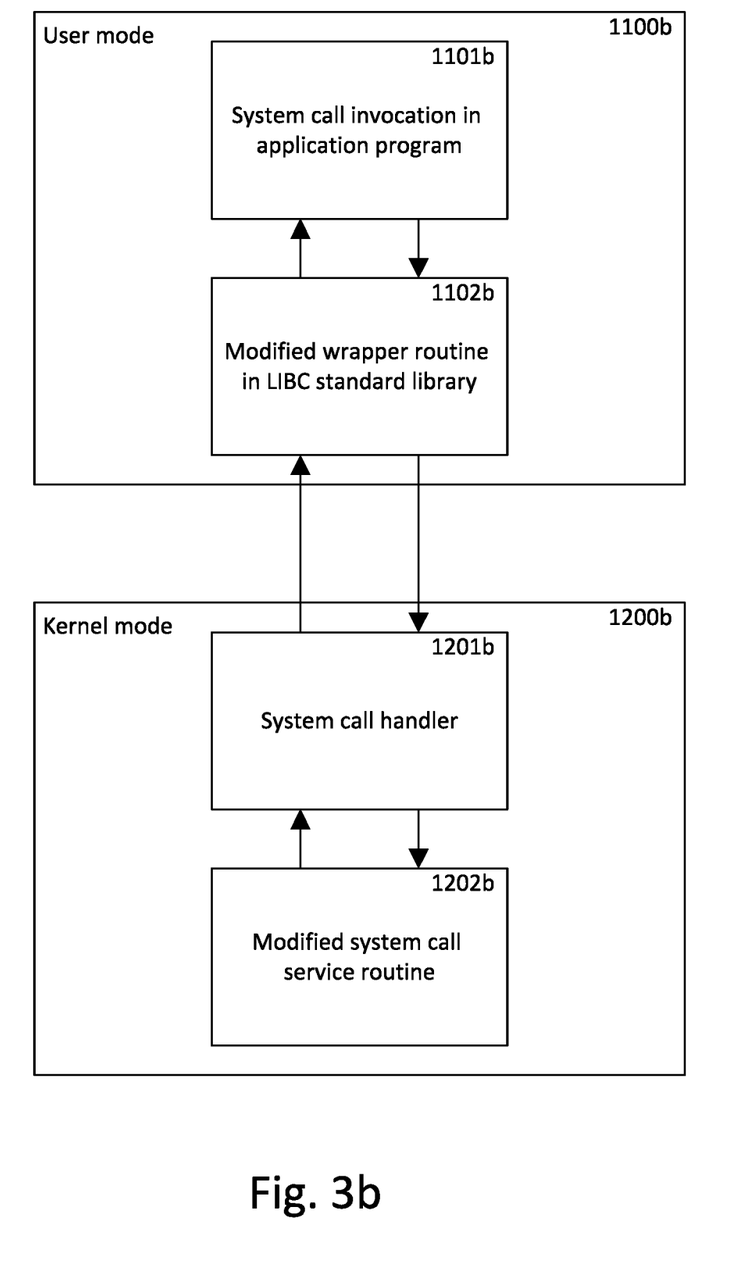
FIG. 3b illustrates a first alternative of the first embodiment of the invention.

FIG. 3*b* illustrates a first alternative of the first embodiment of the invention. In this alternative, the signature of at least one service routine 1202*b* is intentionally modified. Furthermore, the standard library wrapper routine 1102*b* is also intentionally modified to conform to said modified service routine 1202*b*, while preserving the application call invocation 1101*b*. This is particularly applicable to the case of static linking of the application's code with the standard library. More specifically, the wrapper routine 1102*b* is modified such that when it is called by the invocation 1101*b* with an original signature, it transforms the call into the signature expected by the modified service routine 1202*b*. The service routine 1202*b* is modified such that it verifies that the received signature conforms to the modified form. In the affirmative case, the service routine 1202*b* proceeds normally. Otherwise, the service routine 1202*b* issues an alert which is followed by either terminating the caller application (which initiated the system call), or by letting the caller application to proceed under strict supervision. Clearly, the author of a malicious application will not be aware of said modifications, and therefore the malicious application will not be linked with the modified standard library, and will therefore fail upon calling the modified system call. Even if somehow the author of the malicious application will know that a modification was made, he does not have access to the crucial details of the modifications, and therefore his malicious application will fail.

As said, this first alternative of the first embodiment is particularly suited to static linking. However, there are many applications that use dynamic linking. In such case of dynamic linking, the standard library's wrapper routine 1102*b* will be called at runtime dynamically by any application which uses dynamic linking (whether it is malicious or benign), and said wrapper routine 1102*b* will transform the signature of the calling routine, resulting in the modified system call service routine 1202*b* being called and operate properly without raising any alert.

Figure 3C:
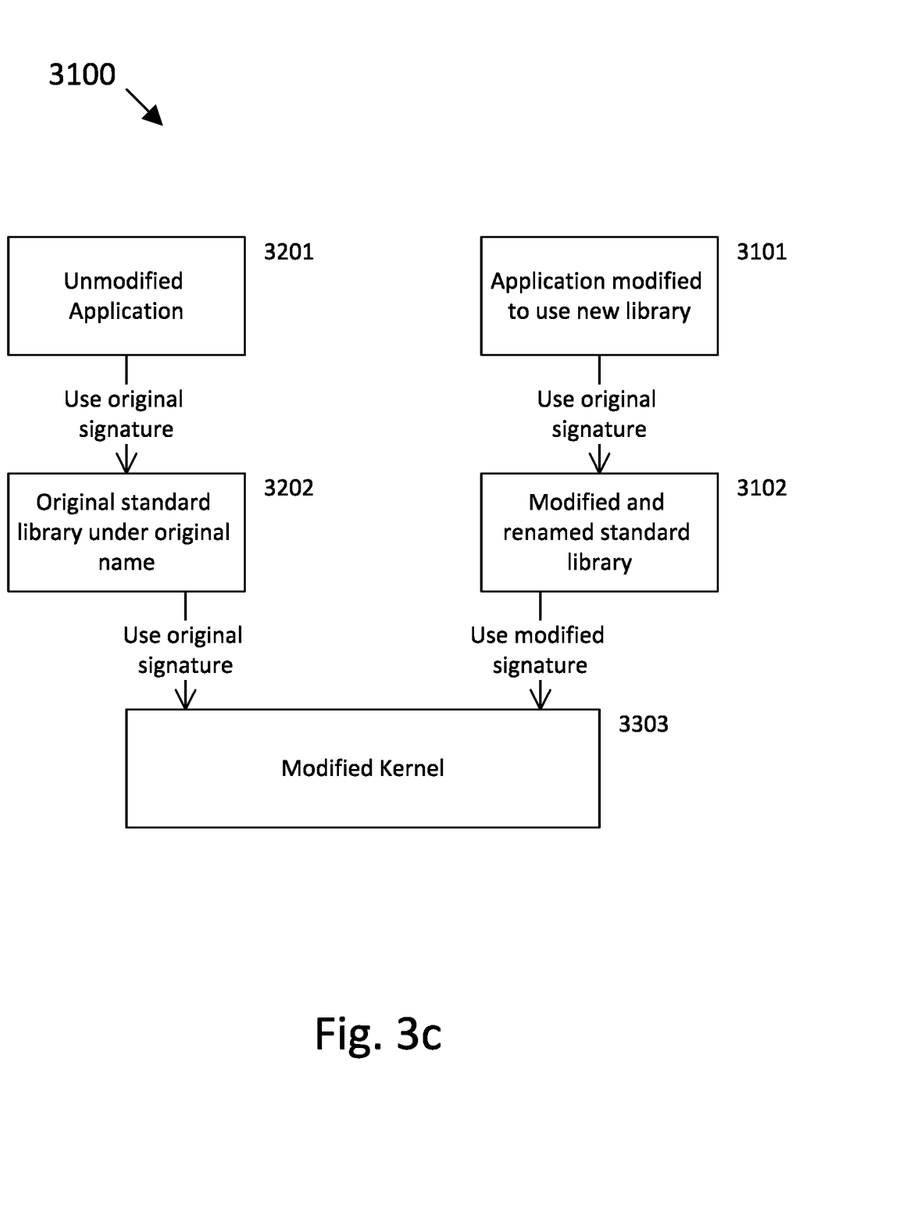
FIG. 3c illustrates a second alternative of the first embodiment adapted for handling dynamic linking.

FIG. 3*c* illustrates a second alternative 3100 of the first embodiment adapted for handling dynamic linking. In said second alternative, the system keeps two different copies of the dynamic standard library as follows: (a) the original dynamic standard library (such as LIBC) 3202 is kept under its original name unmodified, while (b) a modified copy of the dynamic standard library 3102 (where the signatures are modified as noted above) is also kept under a different name. In addition, benign applications 3101 are modified to call said modified copy 3102 of the dynamic standard library (under its new name) rather than calling the original dynamic standard library 3202 (as note, for example, LIBC). However, in this second alternative the signature of the invocation is not modified within the application 3101. In such an arrangement 3100, at runtime any application 3201 which uses dynamic linking but is not modified to call the modified copy by its new name, will fail. Said failure will occur because the application will call the original, unmodified copy of the dynamic standard library 3202, resulting in submitting a wrong signature to the modified kernel 3203.

Figure 3D:
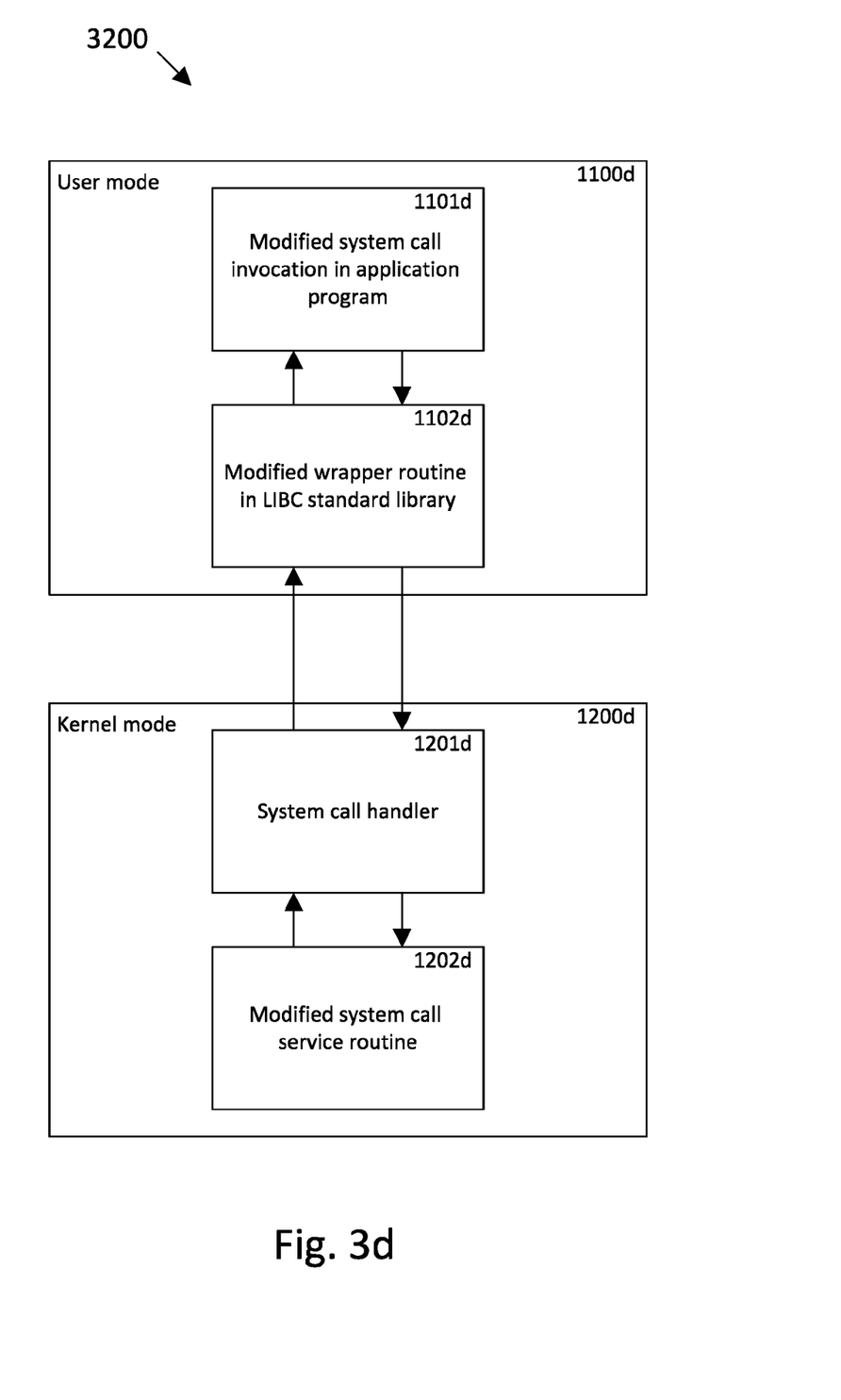
FIG. 3d illustrates a third alternative of the first embodiment which is adapted to cope with dynamic linking without keeping two copies of the dynamic standard library as required by said second alternative.

A third alternative 3200 of the first embodiment which is adapted to cope with dynamic linking without keeping two copies of the dynamic standard library as required by said second alternative, is illustrated in FIG. 3*d*. The essential difference relative to said first and second alternatives is that the application itself is modified to contain the system call invocation 1101*d* with a modified signature, which in turn complies with the modified wrapper routine 1102*d* and with the kernel mode modified service routine 1202*d*. Normally, this alternative requires recompilation and relinking of the modified application program. Thus, even an application which uses dynamic linking must be modified or else it will fail. In this alternative the verification of the signature can be made preferably by the kernel mode service routine 1202*d* (as in the previous alternatives), or by the standard library wrapper routine 1202*d*.

As noted above, all the three alternatives of the first embodiment involve modification to the signature of one or more system calls. One example of such modification involves adding an extra parameter to the signature. In order to make it harder for attacker to break the secured system of the invention, the extra parameter may require a unique value adhering to the type of the relevant parameter (for example, a "magic number" in the case of a numeric parameter). The type of the one or more extra parameters and their unique values are also verified by the service routine at the kernel mode.

Figure 4A:
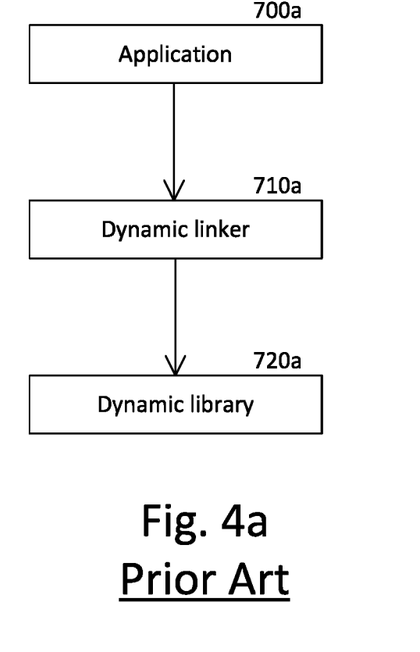
FIG. 4a describes the typical manner by which an application accesses a dynamic library.

According to a second embodiment of the invention, the essential element which is modified is the dynamic linker of the operating system, and all the applications that access the dynamic linker are also modified to conform with said modification of the dynamic linker. FIG. 4a describes the typical manner by which an application accesses a dynamic library. In typical systems, the application 700a which needs to access a dynamic library 720a, uses the dynamic linker 710a which is provided by the operating system. The dynamic linker 710a loads the dynamic library 720a on behalf of the application 700a.

Figure 4B:
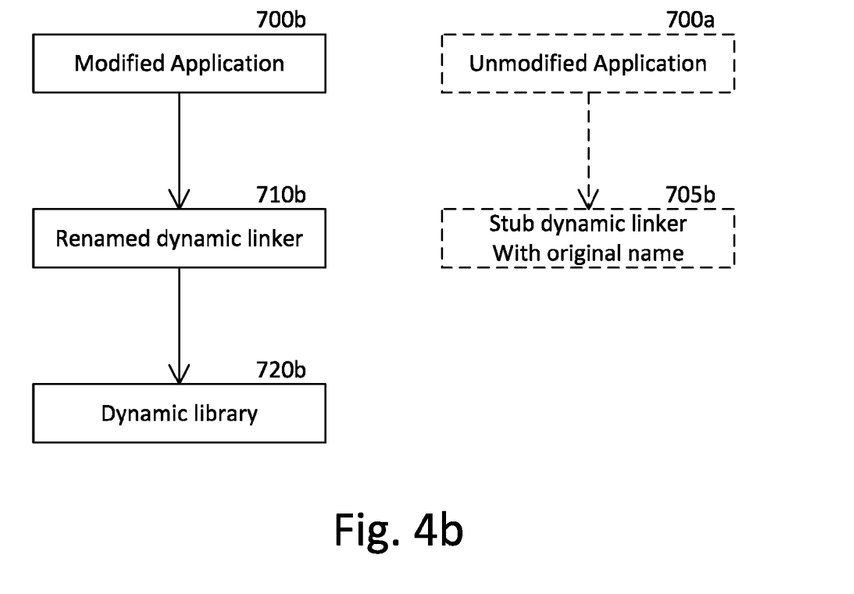
FIG. 4b describes the second embodiment of the present invention.

FIG. 4b describes the second embodiment of the present invention. According to the second embodiment, the name of the dynamic linker 710b is modified in a manner unknown to authors of external applications. Furthermore, all the applications are modified to conform to said name modification of the dynamic linker in order to operate normally. External applications that have not been properly modified, will fail in loading dynamic libraries and will not operate. Optionally, the system further comprises a stub dynamic linker 705b which is kept under the original dynamic linker name. Under this option, when an unmodified application tries to use a dynamic library, it tries to use the dynamic linker 710a by its original name. This unmodified application will reach the stub 705b instead. Stub 705b will raise an alert with respect to the invalid operation of the external application.

Figure 5A:
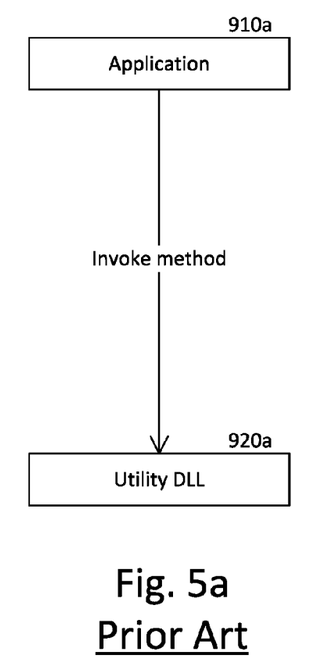
FIG. 5a shows the typical manner by which an application accesses a utility DLL.
Figure 5B:
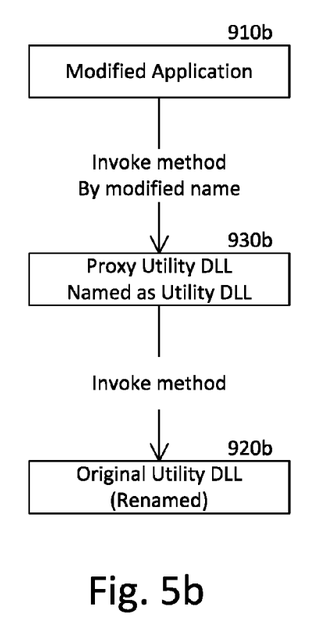
FIG. 5b depicts the modifications made according to the third embodiment.

According to a third embodiment of the invention, the essential elements that are modified are the names of one or more methods in a dynamic link library (DLL), and all the applications that access said dynamic link library are also modified to conform with said modification of the DLL. FIG. 5a shows the typical manner by which an application 910a accesses a utility DLL 920a. FIG. 5b depicts the modifications made according to the third embodiment. The original utility DLL 920b is kept under a modified new name, while a proxy DLL 930b which implements the original DLL methods is kept under the name of the original DLL. One or more of the methods within the proxy DLL 930b are modified to raise an alert when they are called. For each modified method, the proxy DLL 930b supplies a renamed method which simply calls the original method within the renamed original utility DLL 920b. Any application which originally used the utility DLL 920a is modified to call all the renamed methods by their modified name. Thus, an application which is modified will ultimately succeed in calling the appropriate method within the renamed original DLL 920b, while any unmodified application will not only fail, but it will also be detected by the proxy DLL 930b.

The underlying concept of the present invention as described above is not limited to the level of the operating system. It can also be implemented at the level of the instruction set. For example, the standard numeric code of one or more machine-level instructions may be altered in a manner unknown to authors of external programs, while preserving the original functionality of the instructions. This alteration can be obtained for example, by utilizing the "microcode update" facility which is available for modern AMD and Intel processors, or by using some other mechanism which allows such alterations. Alternatively, where a hypervisor is used, this alteration of the instruction set may be obtained by modifying the instruction set which is exposed by the hypervisor. When such low level modifications are made, the operating system along with useful benign programs should be patched to comply with the modified instruction set.

Figure 6:
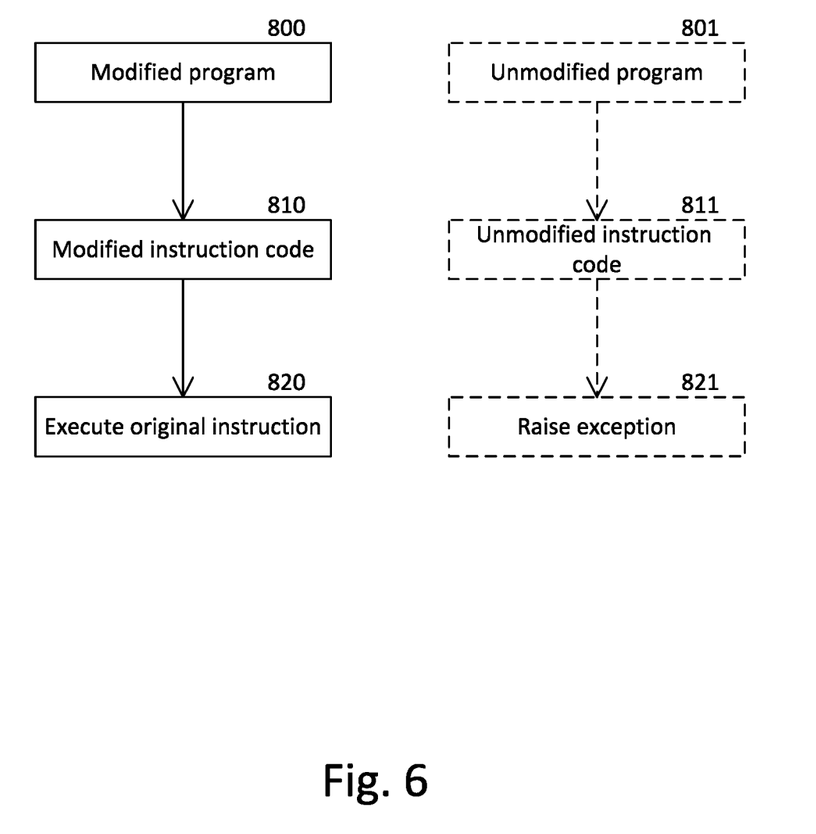
FIG. 6 depicts a fourth embodiment of the present invention, where modifications are made at the level of the instruction set.

FIG. 6 depicts a fourth embodiment of the present invention, where modifications are made at the level of the instruction set. The standard numeric code of a given instruction 820 is replaced by a modified instruction code 810, in a manner unknown to authors of external programs. Consequently, any program which is intended to use the modified instruction-set should be modified accordingly. When a modified program 800 issues a modified instruction code 810, the processor goes on to execute the original instruction 820. On the other hand, when an unmodified program 801 issues the unmodified instruction code 811, the processor raises an exception 821, which indicates an illegal operation. The term 'processor' in this context may refer either to a physical hardware processor, or to a virtual processor implemented by a hypervisor.

Figure 7A:
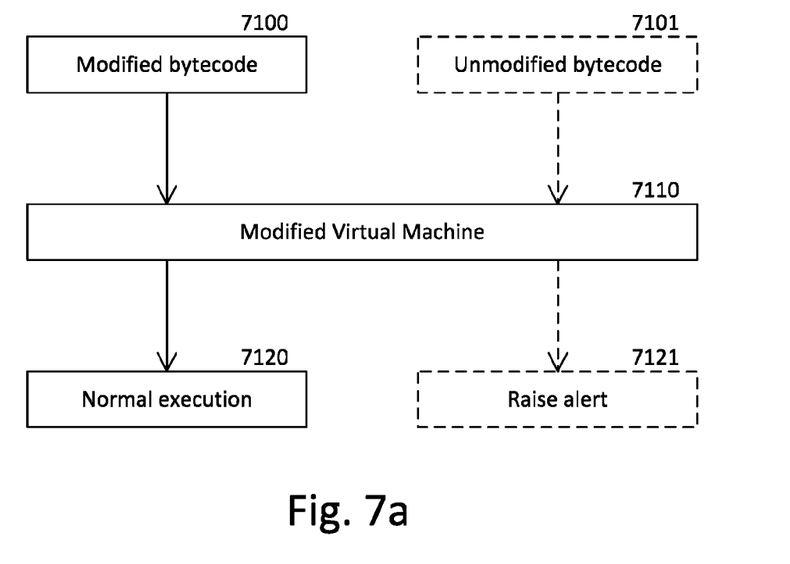
FIG. 7a depicts a first alternative of a fifth embodiment of the present invention, where modifications are made to a virtual machine.

The following fifth embodiment of the invention is described in terms of Java or similar bytecode, where either a Virtual Machine (VM) or a Just In Time (JIT) compiler is applied. FIG. 7a illustrates a first alternative of the fifth embodiment. Modified bytecode 7100 is processed by the modified Virtual Machine 7110, and goes on to normal execution 7120. On the other hand, when unmodified bytecode 7101 is processed by the modified Virtual Machine 7110, an alert 7121 is raised, and the bytecode program is not executed.

Figure 7B:
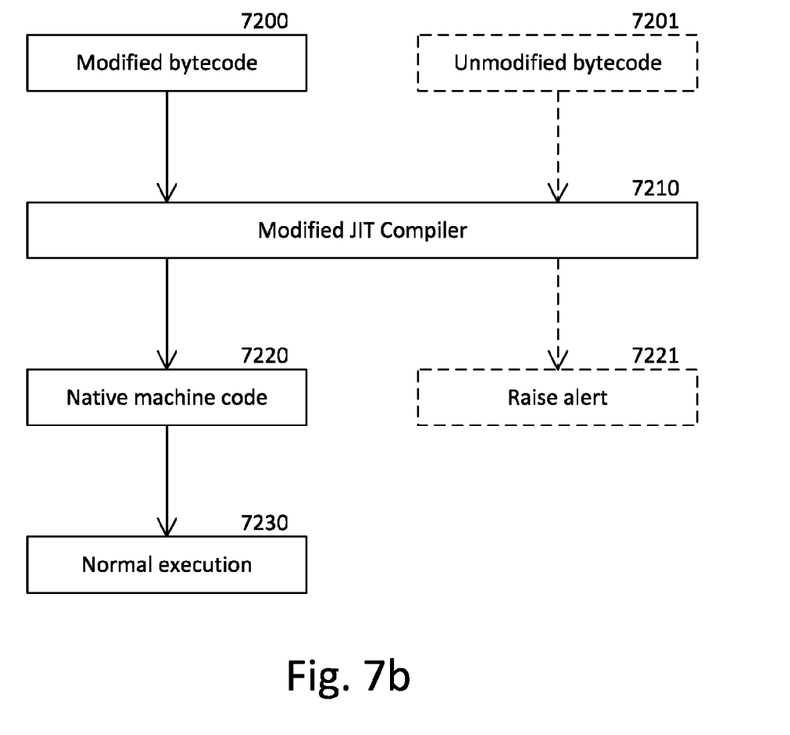
FIG. 7b depicts a fifth embodiment of the present invention, where modifications are made to a Just in Time (JIT) compiler.

FIG. 7b illustrates a second alternative of the fifth embodiment. Modified bytecode 7200 is processed by the modified JIT compiler 7210, and is compiled into valid native machine code 7220, which proceeds to normal execution 7230. On the other hand, when an unmodified bytecode 7201 is processed by the modified JIT compiler 7210, an alert 7221 is raised, and the bytecode program is not executed.

The invention as described above is particularly useful for cases where a central authorization agent is responsible for (a) all operation system modifications and installations; and (b) all applications modifications and installations. Examples for such cases are isolated systems, SCADA, and organizational cellular devices.

While some embodiments of the invention have been described by way of illustration, it will be apparent that the invention can be carried out with many modifications variations and adaptations, and with the use of numerous equivalents or alternative solutions that are within the scope of persons skilled in the art, without departing from the spirit of the invention or exceeding the scope of the claims.

The invention claimed is:

1. A method for providing a computerized system which is protected from malicious programs coming from an external source, the method comprises steps of:
   a) secretly, and in a manner unknown to authors of external programs, modifying on a temporal basis at a central security authority one or more essential elements of an operating system of the computerized system in a manner which causes all running programs to fail due to an exception which indicates an illegal operation, unless they are subjected to a compatible modification which enables them to run properly; and
   b) modifying also on the temporal basis at said central security authority each program which is known to be benign in order to comply with said modification of one or more essential elements, thereby to enable proper execution of the program, and running the modified program at the computerized system;
   which is adapted for a static linking, wherein said modification at the computerized system involves modification to at least one service routine and to a wrapper routine in a standard library, and wherein said modification to each of the benign programs is a compatible modification to a signature of the program;

or which is adapted for a dynamic linking, wherein said modification at the computerized system involves maintaining two copies of a dynamic standard library, a first copy of the dynamic standard library under its original name, and a second copy of the dynamic standard library under a modified name, and wherein said modification to each of the benign programs is a compatible modification to call said modified copy of the dynamic standard library.

2. Method according to claim 1, wherein said modifications involve a modification to one or more essential elements at the operating system, and to each benign program.

3. Method according to claim 1, wherein when a program that does not comply with said modifications is found, the program is halted or sent to a sandbox, and an alert is raised.

4. Method according to claim 1, wherein said modifications involve a modification to the operating system at said computerized system, and wherein said modification to each benign program involves a compatible modification to an instruction set used by the program.

5. Method according to claim 1, wherein said modifications involve a modification to an instruction set of a processor at said computerized system, and wherein said modification to each benign program involves a compatible modification to the instruction set used by the program.

6. Method according to claim 1, which further includes a stub to detect programs that do not comply with said modification at the computerized system.

7. Method according to claim 1 which is adapted for a dynamic linking, wherein said modification at the computerized system involves modification to the wrapper routine in a user mode and to a system call service routing in a kernel mode, and wherein said modification to each of the benign programs is a compatible modification to signatures of one or more system call invocations.

8. Method according to claim 1 wherein said modification at the computerized system involves modification to the names of one or more methods in a dynamic link library, and wherein each of the benign programs are modified to conform with said modification in said dynamic link library.

9. Method according to claim 5, wherein the processor is a physical processor.

10. Method according to claim 5, wherein the processor is a virtual processor or a hypervisor.

11. Method according to claim 1, wherein said modifications are made on the temporal basis, each time a different subset of essential elements and respective parameters are selected for modification.

12. Method according to claim 1, wherein the modification to said program further involves recompilation and or relinking of the program.

13. Method according to claim 4, wherein the modification to said operating system further involves recompilation and or relinking of the operating system.

14. Method according to claim 1, wherein said modifications to one or more essential elements involve modifications to a virtual machine, and wherein said modification to each benign program involves a compatible modification to a bytecode used by the program.

15. Method according to claim 1, wherein said modifications to one or more essential elements involve modifications to a JIT compiler, and wherein said modification to each benign program involves a compatible modification to a bytecode used by the program.

16. Method according to claim 5, wherein the modification of the instruction set is performed by utilizing a microcode update facility available on various modern processors.

* * * * *